EDWARD R. COYNE.
Improvement in Bridge-Gates.

No. 114,414. Patented May 2, 1871.

United States Patent Office.

EDWARD RICHARD COYNE, OF CHICAGO, ILLINOIS.

Letters Patent No. 114,414, dated May 2, 1871.

IMPROVEMENT IN BRIDGE-GATES.

The Schedule referred to in these Letters Patent and making part of the same.

*To all whom it may concern:*

Be it known that I, EDWARD RICHARD COYNE, of Chicago, in the county of Cook and State of Illinois, have invented certain Improvements in Bridge-Gates, of which the following is a specification, reference being had to the accompanying drawing.

My invention relates to automatic gates for swinging bridges; and

It consists in a novel arrangement of the gates and and their operating mechanism, as hereinafter described.

Figure 1:
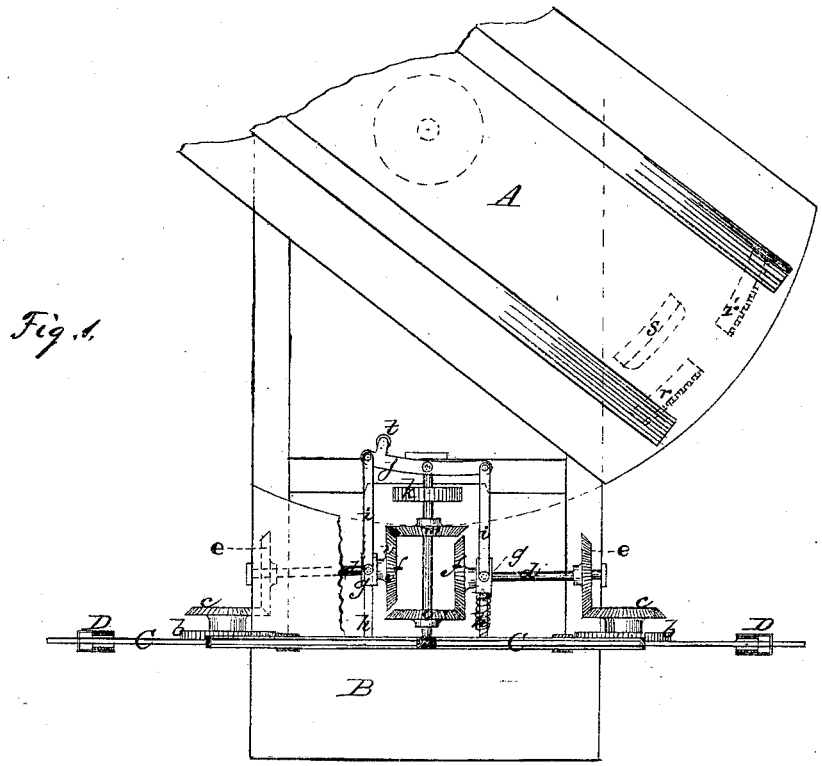
Figure 2:
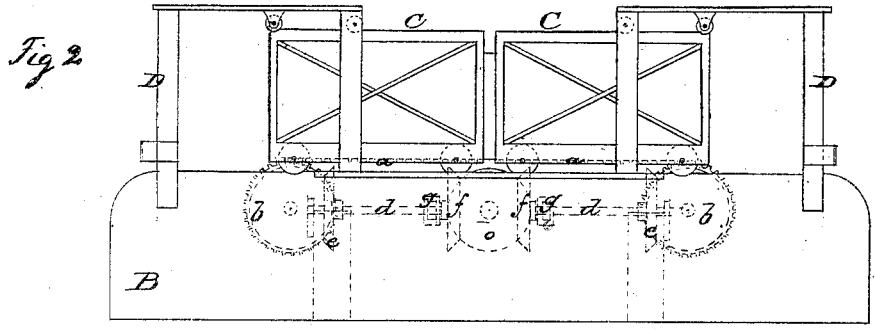

Figure 1 is a top plan view of a bridge and one of the abutments thereof, with my improved gates arranged in connection therewith, and Figure 2 is a side or face view of the gates.

In the drawing—

A represents an ordinary swinging or turning bridge, and

B one of the abutments against which the same closes.

On the abutment are mounted two upright gates, C, arranged to slide endwise on rollers in a framework, D.

These gates may be slid inward against each other so as to close the passage-way to the bridge, or drawn back, one to each side, so as to leave the way clear.

Along the lower side of each of the gates is secured a straight rack-bar, $a$, and within the abutment are mounted two cog-wheels, $b$, gearing each into one of the rack-bars, so that the gates may be opened and closed by turning said wheels.

To the side of each wheel $b$ is secured a bevel-gear wheel, $c$, and in the abutment are mounted, in line with each other, two horizontal shafts, $d$, having secured to their outer ends bevel-wheels $e$, which gear into the respective wheels $c$, as shown in fig. 1.

Each shaft $d$ has secured to its inner end a bevel-wheel, $f$, and the inner end of each shaft is mounted in a box, $g$, arranged to slide on a supporting-bar, $h$, as shown in figs. 1 and 2, so that the ends of the shafts, with wheels $f$, may be moved laterally.

In the face of the abutment is pivoted a lever, $j$, having its opposite ends connected by rods $i$ to the sliding boxes $g$, so that the two boxes must always move together but in opposite directions.

Between the two shafts $d$, at right angles thereto, is mounted a horizontal shaft, $k$, provided with a pinion, $l$, and two bevel-wheels, $m$ and $o$.

The wheels $m$ and $o$ are arranged to gear into the wheels $f$ in the manner shown, wheel $m$ being in gear with one of the wheels $f$, while wheel $o$ is in gear with the other one, as in fig. 1.

If, now, while the parts are in the position shown, the pinion $k$ be turned toward the left, the pinions $b$ will be turned so as to slide the gates C outward and open the approach to the bridge, and upon turning pinion $k$ to the right the gates will be closed again.

By operating the lever $j$ the position of the wheels $f$ may be reversed—that is, the one which was in gear with wheel $m$ moved over so as to gear with wheel $o$, and the one which was in gear with wheel $o$ moved so as to gear with $m$. This being done, the motion of wheels $e$ is reversed, so that turning pinion $k$ to the left serves to close the gates instead of opening them, as before, and *vice versa*.

A spiral spring, $p$, is placed behind one of the sliding boxes so as to keep the wheels in the position shown in fig. 1, except when moved by the bridge, as hereinafter described.

To the under side of the bridge, at one end, are secured two curved rack-bars, $r\ r'$, one on each side of the middle, which, as the bridge swings open and shut, engage with and operate the pinion $k$.

There is also secured to the bridge, at the end and on one side of the middle, a metal plate, $s$, with beveled ends, and on one end of the lever $j$ is mounted a roller, $t$, as shown in fig. 1, so that as the bridge swings to the left the plate strikes the roller, moves the lever, and reverses the gear, as before-described.

The various parts being constructed and arranged as described, their operation is as follows:

Supposing the bridge to be open to the right and the gates to be closed, as shown; if the bridge is closed toward the left the rack-bar $r$ will engage with pinion $k$, and thus open the gates as the bridge closes in place.

If the bridge is closed and be opened toward the right, the rack-bar $r$ will turn the pinion and close the gates.

If the bridge is opened toward the left, the plate $s$, bearing on rollers $t$, operates the lever $j$ and reverses wheels $f$, and the rack-bar $r'$ operates the pinion and opens the gates as before. And in like manner, when the bridge is closed from the left, the plate $s$ keeps the wheels in their reversed position while rack-bar $r'$ operates the pinion and opens the gate.

It is obvious that instead of two gates one long one may be used, the gearing being of course proportioned so as to move the gate the proper distance.

When a single gate is used, one of the shafts $d$ and its wheels and one of the wheels $c$ may be dispensed with.

Gates constructed on my plan are cheap, simple, and durable.

Having thus described my invention,

What I claim is—

The sliding gates C having racks $a$, and the bridge A provided with the racks $r\ r'$ and cam $s$, in combination with the shifting operating gear, arranged to operate substantially as described, whereby the gates are opened and closed by the movement of the bridge, as set forth.

EDWARD RICHARD COYNE.

Witnesses:
WM. H. LOTZ,
G. LOTZ.